United States Patent
Ulrich-Verderber

(10) Patent No.: US 10,756,596 B2
(45) Date of Patent: Aug. 25, 2020

(54) FLUID-POWERED GENERATOR

(71) Applicant: Undula Tech LLC, New York, NY (US)

(72) Inventor: Louisa Ulrich-Verderber, Potsdam, NY (US)

(73) Assignee: Undula Tech LLC, Potsdam, NY (US)

( * ) Notice: Subject to any disclaimer, the term of this patent is extended or adjusted under 35 U.S.C. 154(b) by 0 days.

(21) Appl. No.: 16/158,070

(22) Filed: Oct. 11, 2018

(65) Prior Publication Data

US 2019/0115803 A1     Apr. 18, 2019

Related U.S. Application Data

(60) Provisional application No. 62/572,631, filed on Oct. 16, 2017.

(51) Int. Cl.

| | |
|---|---|
| *H02K 7/18* | (2006.01) |
| *H02K 7/075* | (2006.01) |
| *F03B 13/10* | (2006.01) |
| *F03D 9/25* | (2016.01) |
| *F03B 17/06* | (2006.01) |
| *F03D 5/06* | (2006.01) |
| *F03B 13/26* | (2006.01) |
| *F03D 15/10* | (2016.01) |
| *F03D 9/45* | (2016.01) |
| *F03D 9/46* | (2016.01) |

(52) U.S. Cl.
CPC .......... *H02K 7/1823* (2013.01); *F03B 13/10* (2013.01); *F03B 13/264* (2013.01); *F03B 17/06* (2013.01); *F03D 5/06* (2013.01); *F03D 9/25* (2016.05); *F03D 15/10* (2016.05); *H02K 7/075* (2013.01); *F03D 9/45* (2016.05); *F03D 9/46* (2016.05); *F05B 2210/16* (2013.01); *F05B 2220/00* (2013.01); *F05B 2240/9112* (2013.01); *F05B 2240/9113* (2013.01)

(58) Field of Classification Search
CPC ........ H02K 7/1823; H02K 7/075; F03D 5/06; F03D 15/10
See application file for complete search history.

(56) References Cited

U.S. PATENT DOCUMENTS

| | | | | |
|---|---|---|---|---|
| 2,302,672 A | * | 11/1942 | Buckley | F03D 5/06 416/83 |
| 3,402,707 A | * | 9/1968 | Heron | F16F 15/264 123/192.2 |
| 4,476,397 A | * | 10/1984 | Lawson | F03D 5/06 290/42 |
| 4,915,584 A | * | 4/1990 | Kashubara | F03D 5/06 416/64 |

(Continued)

*Primary Examiner* — Sean Gugger
(74) *Attorney, Agent, or Firm* — Fenwick & West LLP

(57) ABSTRACT

A fluid-powered generator harvests the inherent energy in a flowing medium, such as wind or water, as it flows along a flexible sail, creating an undulating motion that causes rotation of a crankshaft. The generator comprises a plurality of ribs pivotably connected to a support shaft. Each rib is coupled to the sail and to a crank arm such that when the sail undulates, the ribs and crank arm pivot in the direction of the undulation, causing rotation of the crankshaft. The generator thus converts the linear motion of the fluid to circular motion to produce renewable energy.

20 Claims, 9 Drawing Sheets

(56) References Cited

U.S. PATENT DOCUMENTS

| | | | | |
|---|---|---|---|---|
| 5,009,571 | A * | 4/1991 | Smith | F03D 5/06 |
| | | | | 416/79 |
| 8,142,154 | B2 * | 3/2012 | Gartner | F03B 5/00 |
| | | | | 416/132 A |
| 9,234,504 | B1 * | 1/2016 | Granat | F03D 13/20 |
| 10,190,570 | B1 * | 1/2019 | Filardo | F03B 17/06 |
| 2003/0123983 | A1 * | 7/2003 | Bolduc | F03B 17/06 |
| | | | | 416/6 |
| 2008/0036214 | A1 * | 2/2008 | Newman | F03D 5/06 |
| | | | | 290/55 |
| 2009/0121489 | A1 * | 5/2009 | Kawai | F03D 5/06 |
| | | | | 290/55 |
| 2012/0091712 | A1 * | 4/2012 | Hall | F02B 73/00 |
| | | | | 290/44 |
| 2013/0098330 | A1 * | 4/2013 | Sigrist | F16C 7/023 |
| | | | | 123/197.3 |
| 2015/0247526 | A1 * | 9/2015 | Hines | F16C 3/14 |
| | | | | 74/605 |
| 2017/0122299 | A1 * | 5/2017 | Ko | F03B 13/264 |
| 2017/0198679 | A1 * | 7/2017 | Kempkey | F03D 5/06 |
| 2017/0297701 | A1 * | 10/2017 | Hornzee-Jones | B64C 31/06 |
| 2018/0091019 | A1 * | 3/2018 | Fritsch | A61C 1/185 |
| 2018/0328337 | A1 * | 11/2018 | Sichman | F03B 17/06 |

* cited by examiner

FLUID-POWERED GENERATOR

CROSS REFERENCE TO RELATED APPLICATIONS

This application claims the benefit of U.S. Provisional Application No. 62/572,631, filed Oct. 16, 2017, which is hereby incorporated by reference in its entirety as if fully set forth herein.

BACKGROUND

1. Technical Field

The subject matter described generally relates to the field of renewable energy, and in particular, to a fluid-powered generator that converts linear motion to circular motion to produce energy.

2. Background Information

Alternative energy sources offer a means to decrease human reliance on environmentally damaging fossil fuels and instead look to renewable resources to generate needed power. These sources capture energy from on-going natural processes, such as sunshine, wind, water, and geothermal heat. But many renewable energy concepts rely on processes that require large upfront capital investments, use materials with adverse chemical impacts (as in the case of solar power), and often occupy significant amounts of space. For example, wind energy generally relies on turbines that convert the kinetic energy of the wind into mechanical power. However, current residential wind turbines usually require an 80 to 100-foot tower to operate properly in smooth, straight-line wind and therefore require a significant amount of vertical space and horizontal footprint for guy wire stabilization. The size of these turbines also renders installation prohibitively expensive for many people, thus making wind energy an accessible and viable source of renewable energy only in areas that can accommodate the turbines' large footprints and for individuals who can afford the expense. Similarly, solar and geothermal resources are out of reach for many other reasons. These restrictions make untapped potential energy sources very important, if we can harness forces that conventional mechanisms fail to capture.

SUMMARY

A fluid-powered generator harvests the energy of a fluid current, such as wind or water, using a flexible sail (also referred to as a "sheet" or "elongated membrane") aligned longitudinally, or in varying orientations, with the direction of the fluid flow. The generator converts the undulations or flutters of the sail resulting from the fluid flow into rotational motion of a shaft for creating usable power (for instance via coupling to an electrical generator) or to perform other useful work. In various embodiments and applications, the fluid-powered generator is oriented horizontally, vertically, diagonally, or upside down on mounting surfaces to allow the generator to capture ongoing dynamic forces of flowing mediums without the physical and environmental constraints of conventional wind-driven or water-driven power sources.

DETAILED DESCRIPTION

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Figure 1:
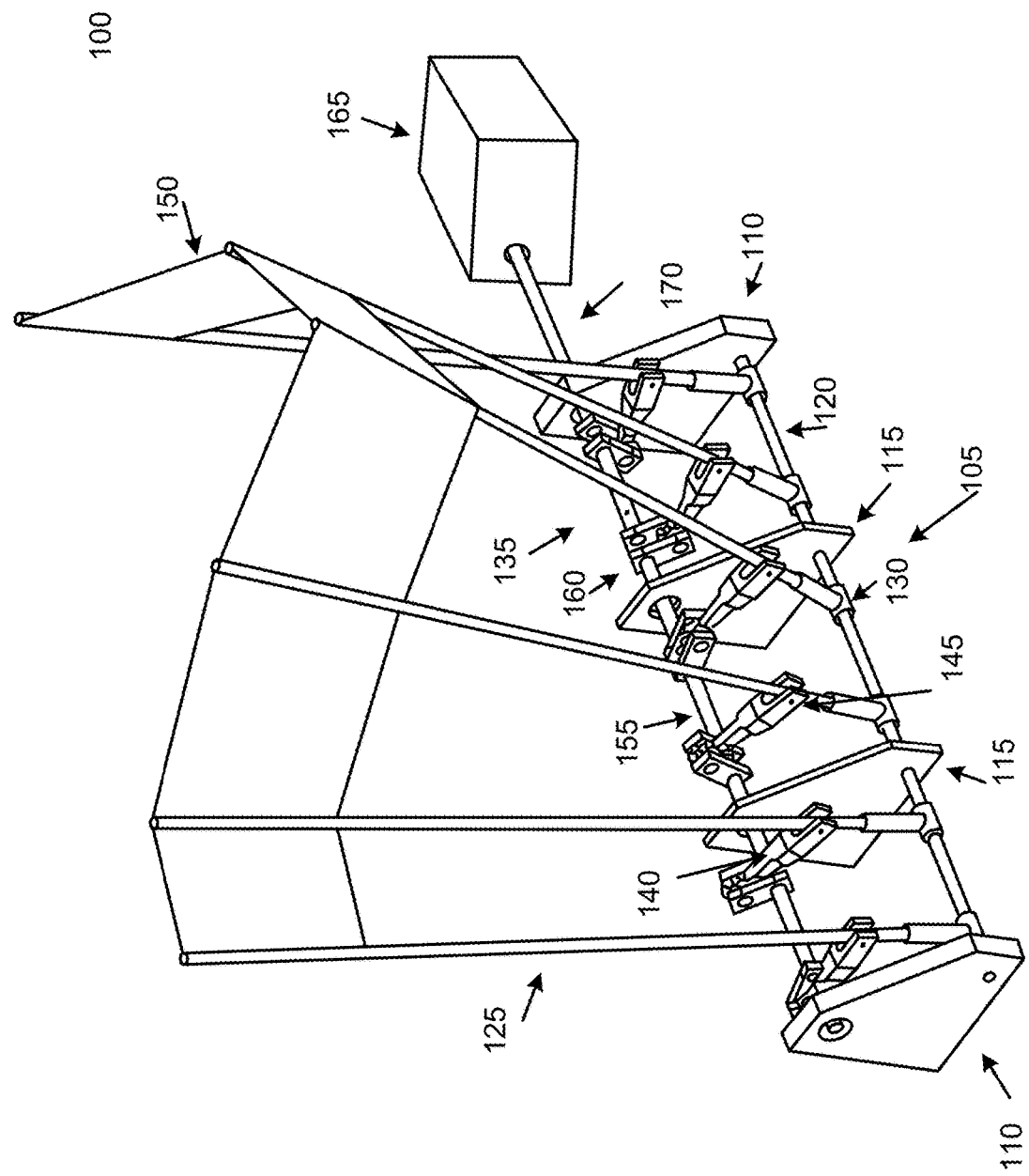
FIG. 1 is a frame of a fluid-powered generator, according to one embodiment.

FIG. 1 illustrates one embodiment of a frame of a fluid-powered generator 100 for generating electrical or other types of force through a connection to an electrical generator subsystem or other device that performs useful work. In the embodiment shown in FIG. 1, the generator 100 includes a base 105 having end supports 110 and interior supports 115; a support shaft 120 coupled to each end support 110 and passing through a hole in each interior support 115; a plurality of ribs 125 rotatably attached to the support shaft 120 by means of rib sockets 130; a crankshaft 135 comprising a plurality of shafts 155, throws 160, and crank arms 140; and a plurality of linkages 145 connecting the ribs 125 to the crank arms 140. The generator 100 also includes a flexible sail 150 coupled to the ribs 125. In the embodiment shown in FIG. 1, the generator 100 is attached by means of a conventional coupling 170 (e.g., belt drive, gear drive, direct drive) to a conventional electrical generator subsystem 165 that generates electricity as a result of rotation of the crankshaft 135. For example, the conventional generator subsystem 165 includes a direct drive motor, the shaft of which is driven by rotation of the crankshaft 135 so as to act as an electrical generator. Alternatively, the generator 100 generates other types of force through a connection to, e.g., a mill wheel or water pump. In alternate configurations, the generator 100 is coupled to other devices that perform useful work, as will be apparent to those skilled in the art.

In other embodiments, the generator 100 contains different and/or additional elements. Additionally, in other configurations, the functions are distributed among the elements in a different manner than described.

The base 105 comprises an end support 110 on each end of the generator 100 and one or more interior supports 115 disposed between the end supports 110 and having cutouts to facilitate the attachment of the support shaft 120 through a bottom portion of the interior supports 115 and the crankshaft 135 through a top portion of the interior supports 115. The support shaft 120 and the crankshaft 135 are rotatably coupled to each end support 110. While two end supports 110 and two interior supports 115 are shown in the displayed embodiment, alternative configurations include a single interior support 115 or a plurality of interior supports 115. Further, while in practice for a roof-mounted generator for supplemental residential electricity it is found that a single section of the generator 100 having six ribs 125 spaced approximately ten to twenty centimeters apart provides good performance, in other embodiments, the displayed portion of the generator 100 is repeated one or more times such that the frame includes additional sections of the supports 110 and 115 and the ribs 125. Alternatively, the interior portion of the frame is extended such that the frame includes an end support 110 on each end of the frame with additional interior supports 115 and ribs 125 disposed between the end supports 110. For example, in one configuration, the frame includes twelve ribs 125 and four interior supports 115 disposed between two end supports 110.

As noted above, in various embodiments, rotational motion of the crankshaft 135 of the generator 100 directly drives a conventional electric generation subsystem 165 (e.g., direct drive DC motor), while in other embodiments, the subsystem 165 is driven by other transmission means such as a gear train or belt/pulley system. For example, in one configuration, a gear train comprising a large pulley and a small pulley is coupled to an exterior wall of the end support 110. Selection of the specific transmission mechanism is based on the particular application at hand, environmental conditions expected at the installation site, and other factors that those skilled in the art will recognize as pertinent to efficient, safe, and reliable operation of the generator 100.

In various embodiments, the length and orientation of the generator 100 is adjusted to meet the dimensions and orientation of the mounting surface or platform. For example, in the configuration shown in FIG. 6, the generator 100 is mounted horizontally and spans the roof of a building. Similarly, the generator 100 can be mounted horizontally in other areas of continual fluid flow, such as on a highway median, between buildings, or in a tunnel traversed by cars and/or trains. In alternative embodiments, the generator 100 is disposed vertically or diagonally on the mounting surface, e.g., on the side or corner of a building. In still other embodiments, the generator 100 is mounted upside down such that the bottom of the base 105 is facing upward and the tops of the ribs 125 and the sail 150 are facing downward. For example, in some embodiments where the fluid current is water, the ribs 125 and the sail 150 are placed in the water with the base 105 located above the ribs 125 and outside of the water. In such a configuration, the current of the water causes continuous waves of undulation along the length of the generator 100. In various such embodiments, the generator 100 includes a plurality of ribs 125 spanning the length of the mounting surface or smaller frame sections as shown in FIG. 1.

In various embodiments for different applications, the generator 100 as well as the electrical generator subsystem 165 or other device to which the generator 100 is coupled is sized appropriately for the mounting surface and the strength of the fluid flow. For example, in an embodiment where the generator 100 is mounted horizontally along the ceiling of a mile-long highway tunnel, the generator 100 spans the length of the median. Conversely, another tunnel-based application for powering marking lights only requires a far smaller embodiment, with a generator on the order of only centimeters needed to charge a battery-powered LED marker.

The support shaft 120 spans the length of the base 105 and is coupled to a bottom portion of the end supports 110 and the interior supports 115. In one embodiment, the support shaft 120 is a single rounded elongated member that passes through holes in the interior supports 115 and is coupled at each end to an end support 110. Alternatively, the support shaft 120 comprises a plurality of shorter sections of the elongated member. For example, in one configuration, a first section of the support shaft 120 is coupled to an end support 110 at a first end and to an interior support 115 at a second end. A second section is coupled to interior supports 115 at either end and a third section is coupled to an interior support 115 at a first end and to an end support 110 at a second end.

Disposed along the length of the support shaft 120 are a plurality of hollow rib sockets 130 that facilitate the attachment of the ribs 125 to the support shaft 120 such that when the ribs 125 pivot on the support shaft 120, the support shaft 120 rotates on its axis in the direction of the undulation. The rib sockets 130 include a horizontal portion through which the support shaft 120 is inserted and a vertical portion perpendicular to the horizontal portion into which a first end of a rib 125 is inserted, as discussed below with respect to FIG. 3.

The ribs 125 are rotatably coupled to the support shaft 120 at the first end and to the sail 150 at the second end. Each rib 125 is disposed perpendicularly to the support shaft 120 and radiates outward from a rib socket 130. In one embodiment, the ribs 125 are comprised of a rigid material, such as aluminum rod stock, while in other configurations, the ribs 125 are flexible and are made, for example, of plastic or carbon fiber. In such configurations, ribs 125 made of a flexible, resilient material add a dampening effect to high velocity surges.

In one embodiment, the ribs 125 are equidistantly spaced on the support shaft 120 between the end supports 110 and the interior supports 115 and between interior supports 115. While six ribs 125 are shown in the displayed embodiment, more or fewer ribs 125 are used in other configurations, as described above.

In one embodiment, the sail 150 is a durable fabric sheet having an elongate rectangular shape. The fabric comprises any material capable of forming a flexible fabric, such as natural materials, synthetic materials, and metallic materials. For example, in various configurations, embodiments use fabric made of nylon, MYLAR, or TYVEC. In alternate configurations, the sail 150 is a non-fabric construction, such as thin flexible sheets of metal or plastic. Additionally or alternatively, the fabric includes pleats along the length of the sail 150 that allow the sail 150 to stretch to absorb shock from the velocity of the fluid flow. In some embodiments, the height of the sail 150 is approximately 40 centimeters. As will be apparent to one of skill in the art, in various embodiments, the sail 150 is longer or shorter and comprised of different materials depending on the conditions, application, and/or scale of the machine needed to perform the work.

The sail 150 is attached to each of the ribs 125 at a second end of the ribs 125. In one embodiment, the sail 150 has a plurality of pockets spanning the height of the sail 150 such that the ribs 125 are inserted into the pockets to allow the sail 150 to attach to the ribs 125. In other embodiments, the sail 150 is sewn to the ribs 125. In still other configurations, other suitable attachment mechanisms are used as will be apparent to those skilled in the art.

The sail 150 divides the fluid current longitudinally and interacts with the flow in mutual motion akin to the undulating wave motion of a flag flapping in the wind. When the generator 100 is placed in a fluid flow (e.g., a wind flow), the fluid causes the sail 150 to undulate or flutter. The undulations cause the ribs 125 to oscillate about the support shaft 120 over a limited range of angular motion. The undulation propagates along the sail 150 such that each portion of the sail 150 has an interactive force on the adjacent portion of the sail 150. The phasing of the ribs 125 and the crank arms 140 results in a smooth, controlled undulation and smooth power transmission to the crankshaft 135, as discussed below.

The crankshaft 135 comprises a plurality of rounded co-linear shafts 155 disposed horizontally between the end supports 110. In one embodiment, the crankshaft 135 is parallel to the support shaft 120 and is coupled to a first end support 110 at a first end of the crankshaft 135 and to a second end support 110 at the second end of the crankshaft 135. The interior supports 115 each include a hole at the top of the interior support 115 to allow the crankshaft 135 to pass through the interior supports 115. In one embodiment, the crankshaft 135 comprises six shafts 155, with each shaft 155 collinear to the adjacent shaft 155. In other embodiments, the crankshaft 135 has more or fewer than six shafts 155.

The shafts 155 of the crankshaft 135 are separated from each adjacent shaft 155 by a throw 160 having a crank pin disposed horizontally between two vertical webs such that the crank pin is parallel to the crankshaft 135, and the webs are perpendicular to the crankshaft 135 at a first end of the webs and to the crank pin at a second end of the webs. The throw 160 allows the shafts 155 to rotate on the crankshaft axis. A crank arm 140 is coupled to the crank pin on a first end of the crank arm 140 and is rotatably connected to a rib 125 by means of a linkage 145 on a second end of the crank arm 140 such that when the rib 125 pivots on the support shaft 120, the crank arm 140 rotates in the direction of the pivot, causing the crankshaft 135 to rotate on its axis.

Figure 2:
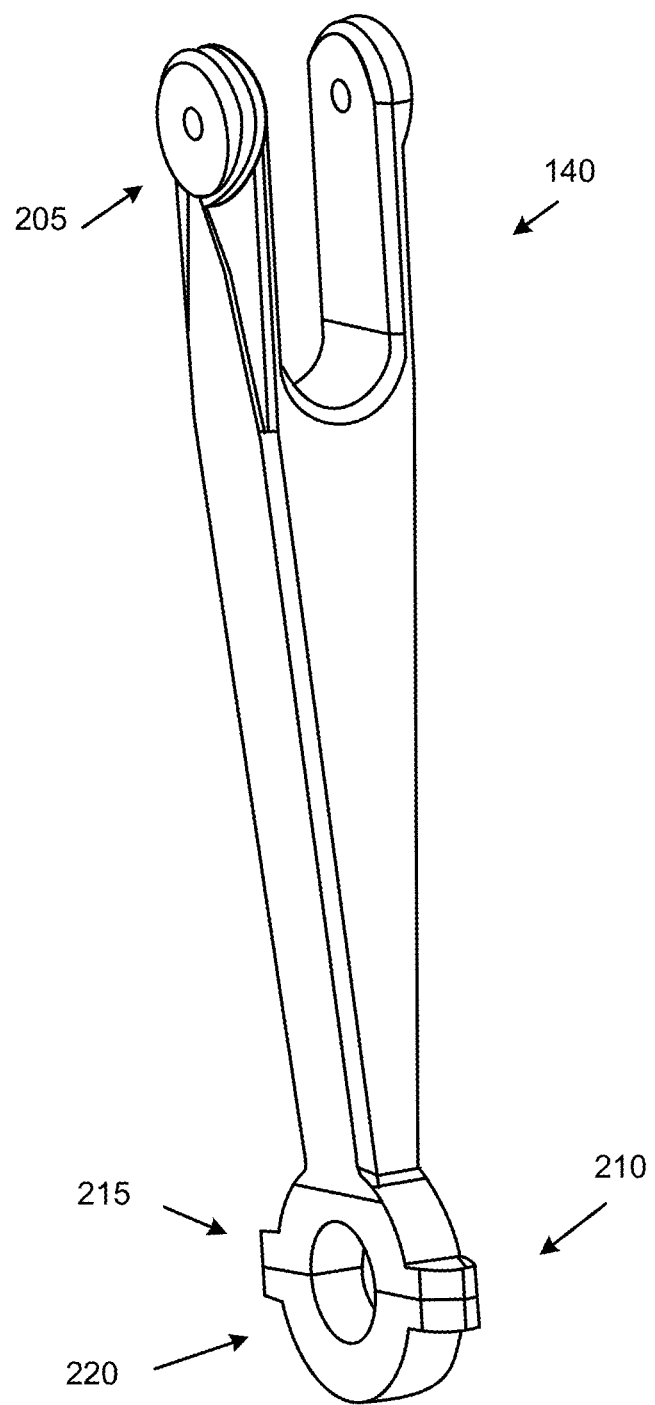
FIG. 2 is a crank arm of the fluid-powered generator of FIG. 1, according to one embodiment.

FIG. 2 is a crank arm 140 of the fluid-powered generator 100 of FIG. 1, according to one embodiment. Each crank arm 140 is attached to a rib 125 at a second end 205 by means of a linkage 145 and to a crank pin of the corresponding throw 160 at a first end 210. The first end 210 of the crank arm 140 comprises a top portion 215 and a bottom portion 220 that are coupled together on either side of a gap between the portions 215 and 220 by means of a linkage such as a bolt or a pin. In one embodiment, the top portion 215 and the bottom portion 220 are coupled around the crank pin such that the crank pin passes through the gap between the portions 215 and 220, securely connecting the crank arm 140 to the crank pin.

Figure 3:
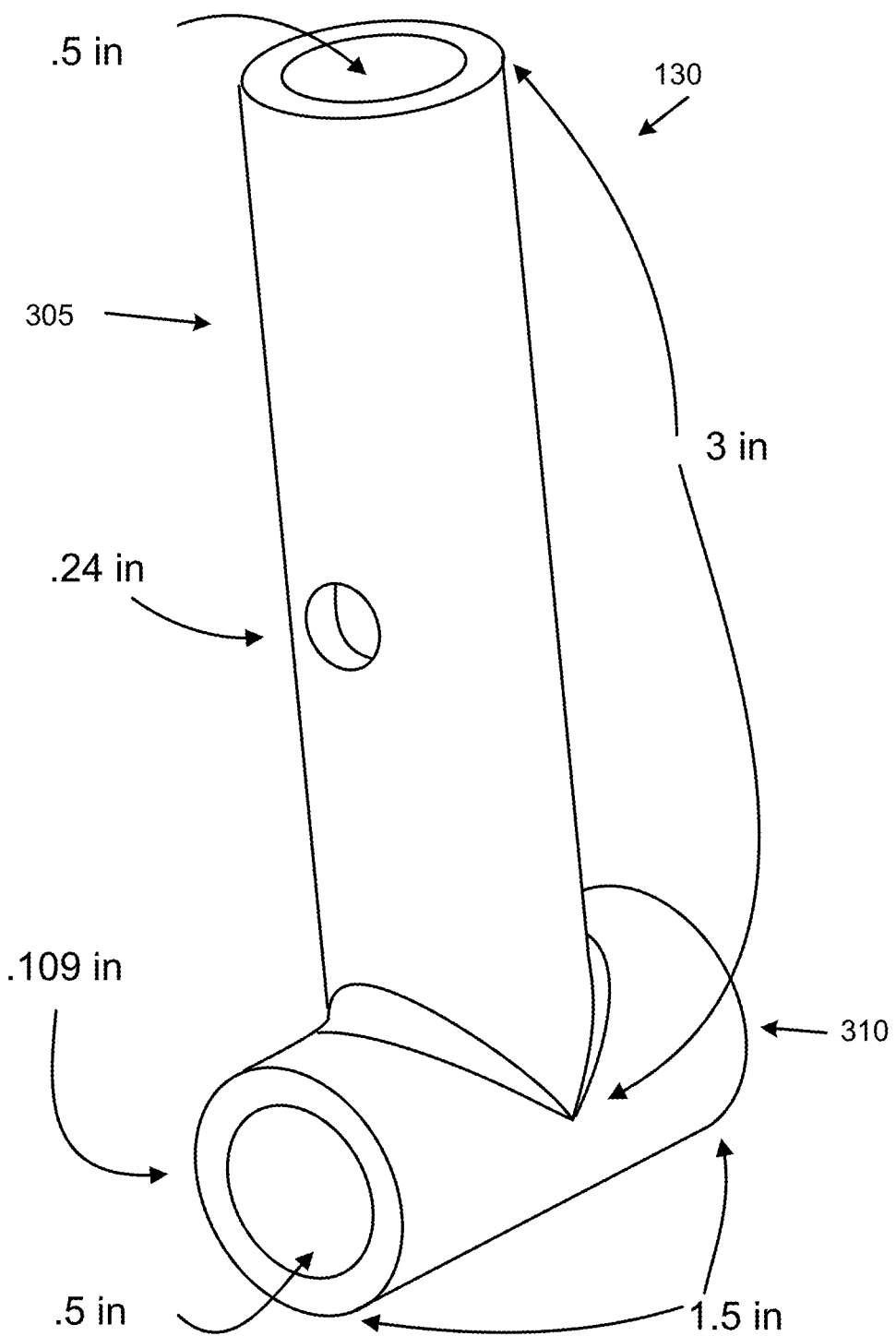
FIG. 3 is a rib socket of the fluid-powered generator of FIG. 1, according to one embodiment.

FIG. 3 is a rib socket 130 of the fluid-powered generator 100 of FIG. 1, according to one embodiment. As shown in FIG. 3, the rib socket 130 is hollow and includes a vertical portion 305 and a horizontal portion 310. As discussed above with respect to FIG. 1, the vertical portion 305 is structured to receive a first end of a rib 125 and the horizontal portion 310 is structured to allow the support shaft 120 to pass through the rib socket 130 such that when the rib 125 undulates (e.g., as a result of fluid flow), the rib 125 pivots on the support shaft 120. In one embodiment, the height of the vertical portion 305 is approximately twice the length of the horizontal portion 310. For example, in the embodiment shown in FIG. 3, the height of the vertical portion 305 is approximately three inches from the top of the horizontal portion 310 and the length of the horizontal portion 310 is approximately one and one-half inches. However, one of skill in the art will recognize that the generator 100 and thus the rib sockets 130 are smaller or larger than the displayed embodiment in alternative configurations. Further, in some embodiments, the width of the vertical portion 305 and the horizontal portion 310 is substantially the same such that the rib 125 and the support shaft 120, which are coupled to the vertical portion 305 and the horizontal portion 310 respectively, also have substantially the same width.

Figure 4:
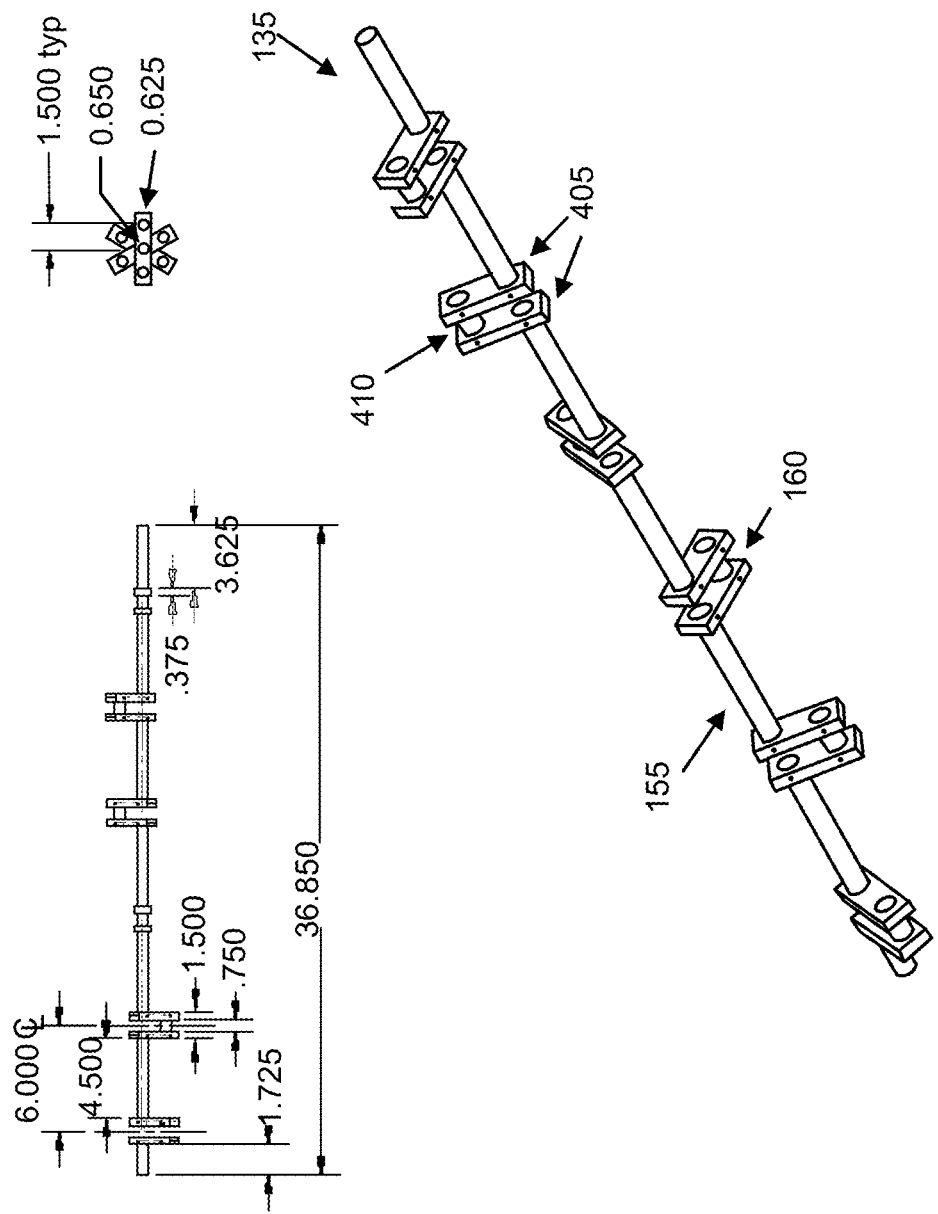
FIG. 4 is a crankshaft of the fluid-powered generator of FIG. 1, according to one embodiment.

FIG. 4 is a crankshaft 135 of the fluid-powered generator 100 of FIG. 1, according to one embodiment. As discussed above with respect to FIG. 1, the crankshaft 135 comprises a plurality of shafts 155 connected by throws 160 that allow the crankshaft 135 to rotate on its axis. Each throw 160 comprises two webs 405 disposed perpendicularly to the crankshaft 135 on either side of a crank pin 410. A crank arm 140 is coupled to the crank pin 410 at a first end of the crank arm 140 and to the to a rib 125 at a second end of the crank arm 140 such that when the rib 125 pivots on the support shaft 120, the crank arm 140 rotates in the direction of the pivot, causing the crankshaft 135 to rotate on its axis. While six throws 160 connecting six shafts 155 are shown in the displayed embodiment, alternative configurations have more or fewer throws 160 and shafts 155.

Figure 5:
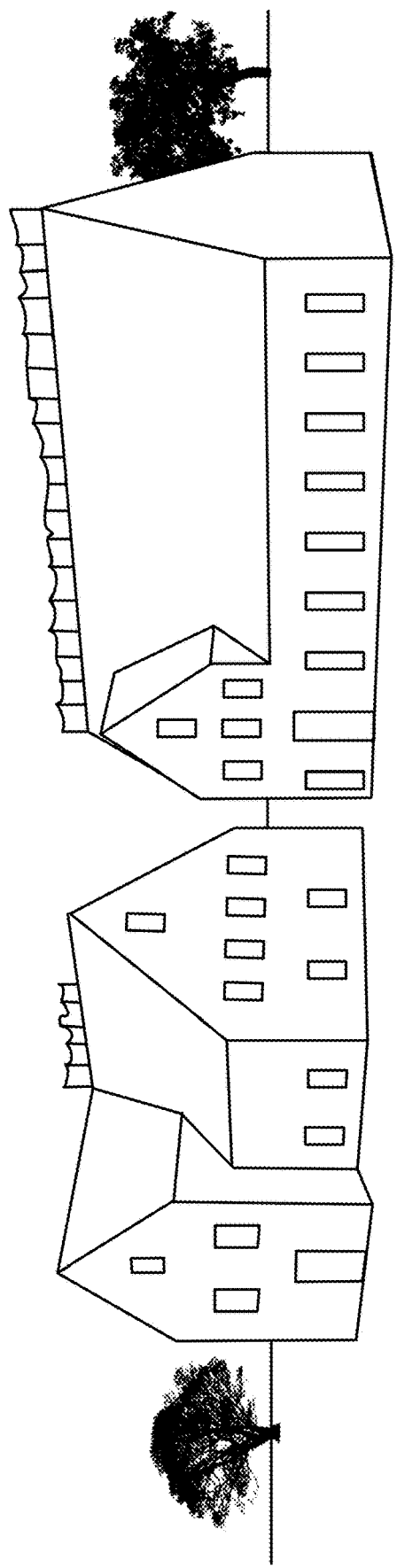
FIG. 5 illustrates an implementation of the fluid-powered generator of FIG. 1 in which the generator is mounted horizontally on building rooflines, according to one embodiment.

FIG. 5 illustrates an implementation of the fluid-powered generator 100 of FIG. 1 in which the generator is mounted horizontally on building rooflines, according to one embodiment. While the frame of the generator 100 displayed in FIG. 1 comprises six ribs 125, FIG. 5 illustrates that other embodiments of the generator 100 include additional ribs 125 (e.g., a number of ribs 125 sufficient to span the length of the displayed rooflines). In alternative configurations, the generator 100 is mounted vertically on the mounting surface such that the ribs and sail 150 are disposed perpendicularly to the mounting surface. For example, the generator 100 can be mounted vertically on a side or a corner of the buildings shown in FIG. 5 and can occupy a portion of the height of the buildings or span the height of the buildings.

In practice, for residential generation of electricity using a roof-mounted wind-powered generator, it is found that the following specifications yield a good compromise of form factor, efficiency, and reliable operation: a generator 100 length of approximately 70 to 90 centimeters, a rib 125 height of approximately 80 to 100 centimeters, a spacing between adjacent ribs 125 of approximately 10 to 20 centimeters, and a crank arm 140 length of approximately 10 to 15 centimeters. As will be apparent to one of skill in the art, the specifications of the generator 100 vary in alternate configurations.

Figure 6:
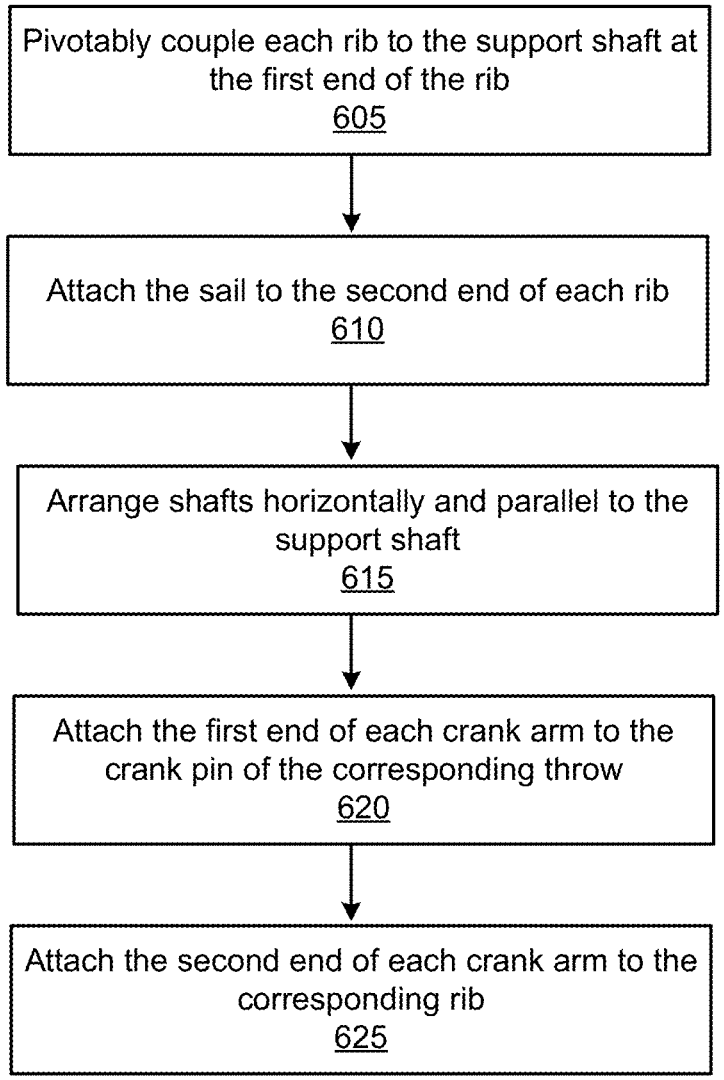
FIG. 6 is a flowchart illustrating a method for making a fluid-powered generator, according to one embodiment.

FIG. 6 is a flow chart illustrating a method for providing a fluid-powered generator, according to one embodiment. At 605, a plurality of ribs 125 are pivotably coupled to an elongated support shaft 120. The ribs 125 are disposed horizontally between end supports 110 of the base 105 with each rib 125 protruding perpendicularly from the support shaft 120 at a first end of the rib 125. In one embodiment, each rib 125 is coupled to the support shaft 120 by means of a rib socket 130, as discussed above with respect to FIG. 3.

At 610, a flexible sail 150 is attached to the second end of each rib 125 such that the sail spans the length of and between the ribs 125. In one embodiment, the sail 150 has a plurality of pockets spanning the height of the sail 150 that facilitate the attachment of the ribs 125 to the sail 150. When the generator 100 is placed in a fluid flow (e.g., in an area of high wind, or flowing water), the fluid causes the sail 150 to undulate along its length, causing the ribs 125 to pivot on the support shaft 120.

At 615, the crankshaft 135 is generated by arranging a plurality of co-linear shafts 155 horizontally between the end supports 110 and coupling each shaft 155 to each adjacent shaft 155 by means of a throw 160 having a crank pin disposed horizontally between two vertical webs such that the crank pin is parallel to the crankshaft 135, and the webs are perpendicular to the crankshaft 135.

At 620, a first end of each crank arm 140 is attached to each throw 160 by coupling a top portion of the crank arm 140 and a bottom portion of the crank arm 140 around the crank pin such that the crank pin passes through the gap between the top and bottom portions.

At 625, the second end of each crank arm 140 is coupled to a corresponding rib 125 by means of a linkage such that when the rib 125 pivots on the support shaft 120, the crank arm 140 rotates in the direction of the pivot, causing the crankshaft 135 to rotate on its axis. In various embodiments, the generator 100 is positioned to engage with the flow of fluid. For example, in some configurations, the generator 100 is disposed horizontally and right-side up along a rooftop or a highway median to capture linear motion of the wind. In an alternate configuration, the generator 100 is oriented upside down above a flowing body of water with the sail 150 and the ribs 125 in the water and the base 105 positioned above the sail 150 and ribs 125 out of the water.

Figure 7:
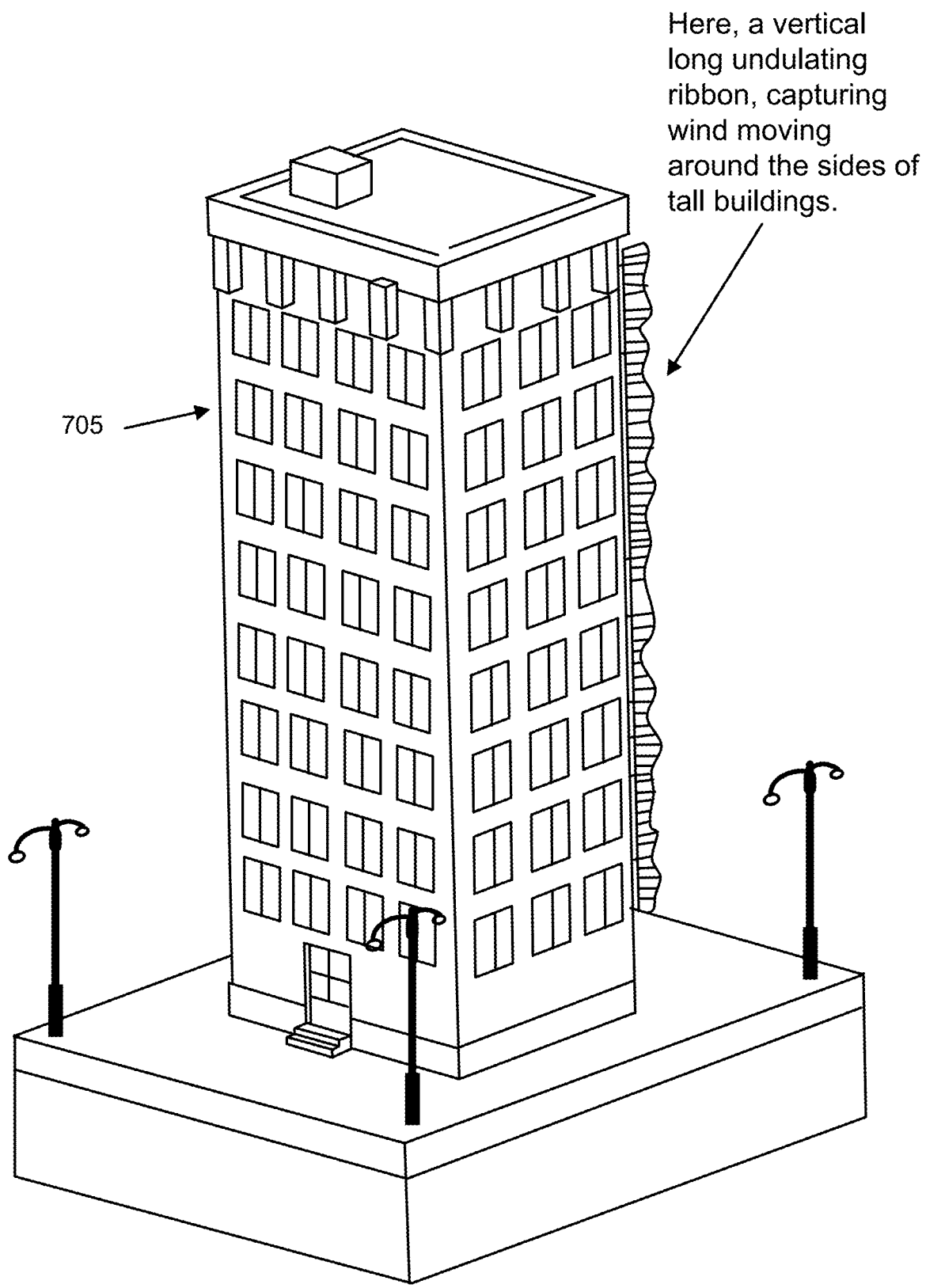
FIG. 7 illustrates an implementation of the fluid-powered generator of FIG. 1 in which the generator is mounted vertically on the side of a building, according to one embodiment.

FIG. 7 illustrates an implementation of the fluid-powered generator 100 of FIG. 1 in which the generator 100 is mounted vertically on the side of a building 705, according to one embodiment. While the generator 100 of FIG. 1 is oriented horizontally with the tops of the ribs 125 and sails 150 facing upward, FIG. 7 illustrates a configuration in which the ribs 125 and sails 150 are disposed perpendicularly to the mounting surface such that the sail 150 captures wind flow around the side of the building. In the embodiment shown in FIG. 7, the generator 100 spans the height of the mounting surface, while in other embodiments, the generator 100 occupies a portion of the height of the mounting surface. Additionally, while the displayed embodiment shows the generator 100 mounted on a corner of the building 705, in various configurations, the generator 100 is mounted vertically on a flat mounting surface, such as a side of a building 705. The electrical generator subsystem 165 or other device used to perform work (not shown) is operatively coupled to the generator 100 as previously described.

Figure 8:
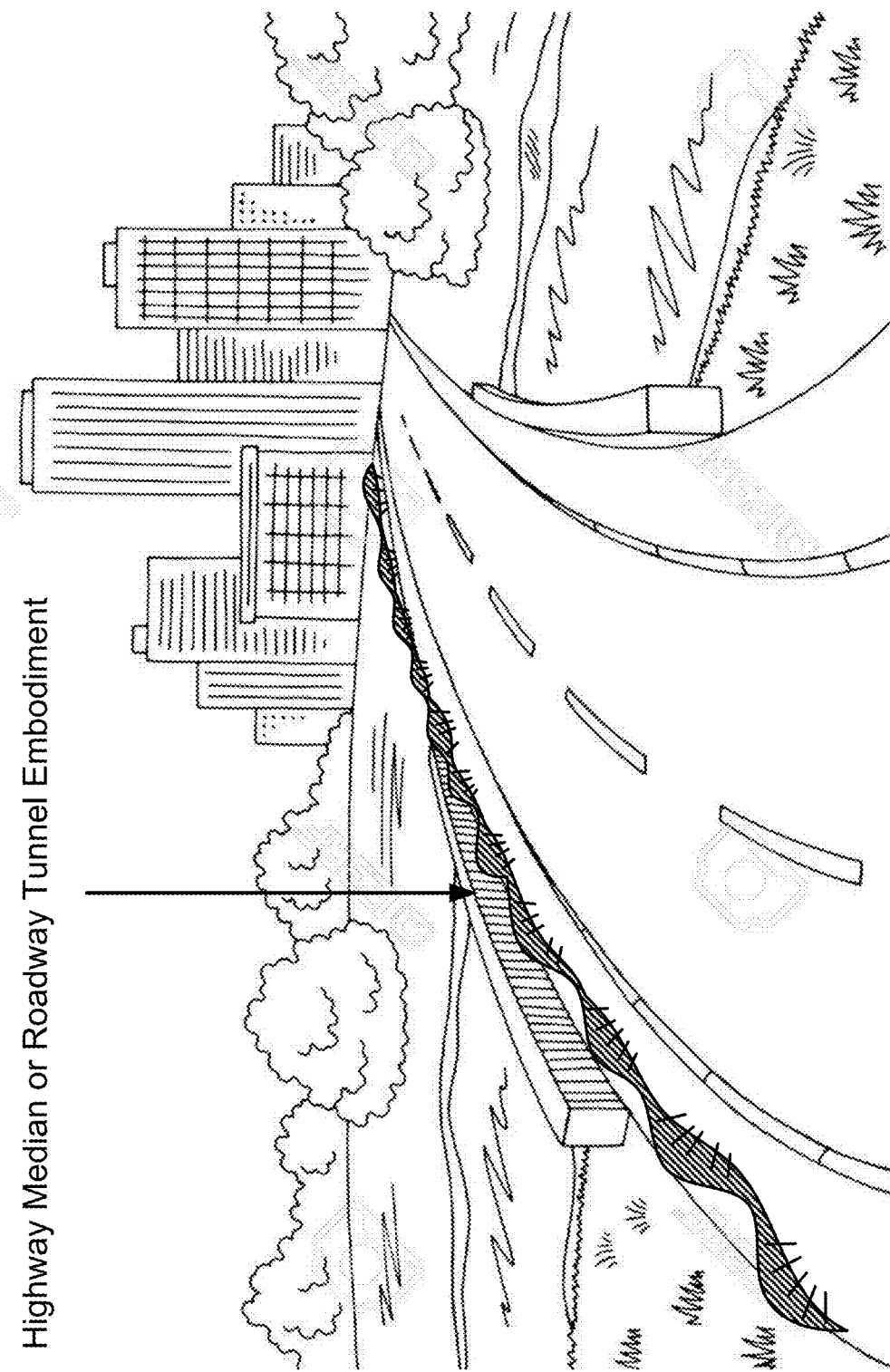
FIG. 8 illustrates an implementation of the fluid-powered generator of FIG. 1 in which the generator is mounted horizontally along a highway median, according to one embodiment.

FIG. 8 illustrates an implementation of the fluid-powered generator 100 of FIG. 1 in which the generator is mounted horizontally along a highway median, according to one embodiment. The generator 100 and the electrical generator subsystem 165 (not shown) are oriented right-side up such that the base 105 is mounted along the top of the highway median with the ribs 125 and sail 150 facing upward. In one embodiment, the generator 100 is placed in a two-way airflow (i.e., on a center median of a two-way highway) while in alternate configurations, the traffic on either side of the generator 100 flows in a single direction.

While the displayed embodiment shows the generator 100 spanning the length of the median, it will be apparent to one of skill in the art that in alternate configurations, the generator 100 occupies a smaller portion of the median or that smaller sections of the generator 100 are oriented horizontally along different portions of the median, such as in high-traffic areas that produce a substantial amount of wind flow. As is shown in FIG. 8, the sail 150 and the ribs 125 undulate in the airflow created by passing vehicles, causing rotation of the crankshaft 135.

Figure 9:
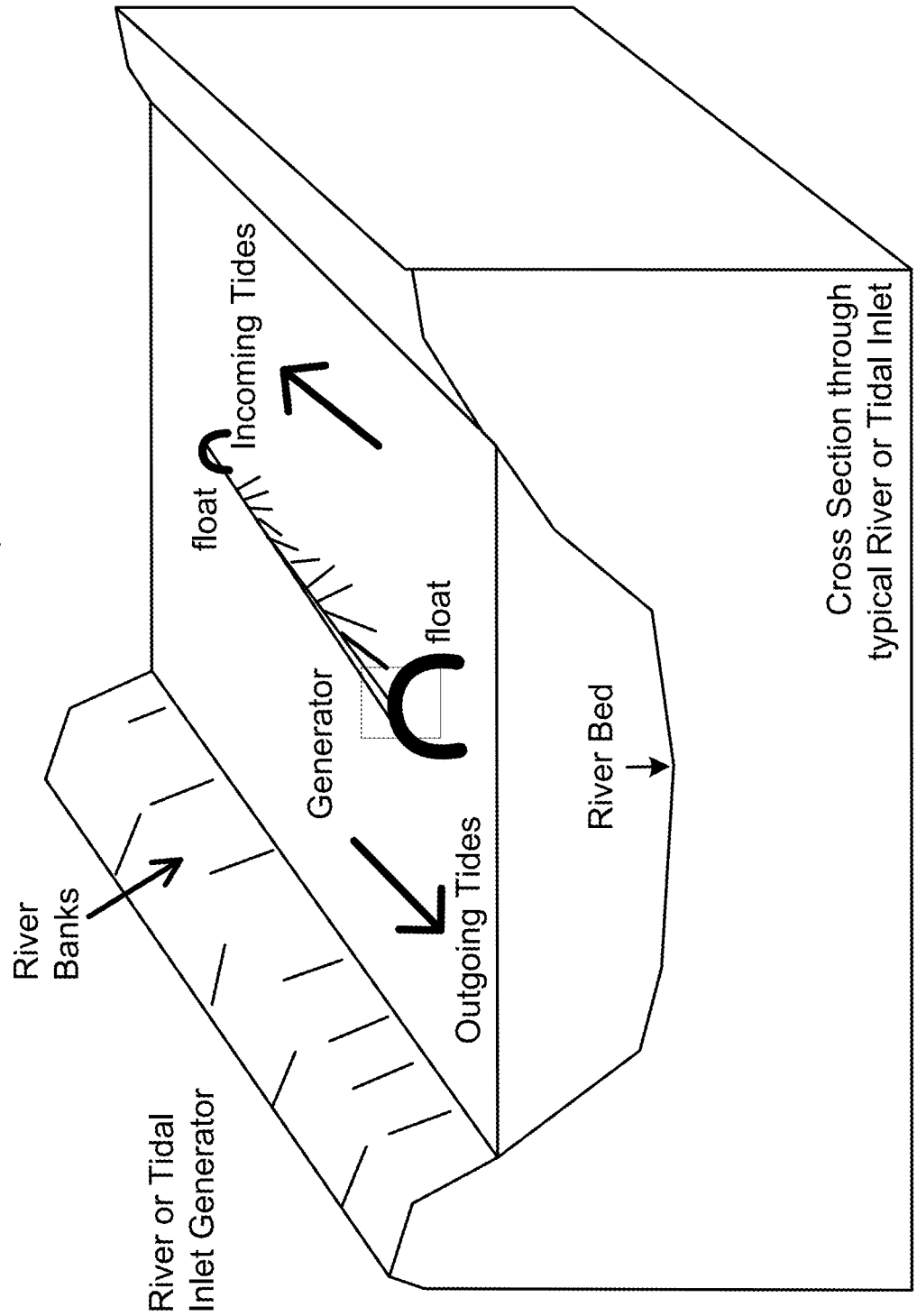
FIG. 9 illustrates an implementation of the fluid-powered generator of FIG. 1 in which the generator is mounted upside down in a body of water, according to one embodiment.

FIG. 9 illustrates an implementation of the fluid-powered generator 100 of FIG. 1 in which the generator is mounted upside down (compared to as shown in FIG. 1) in a body of water, according to one embodiment. While the generator 100 of FIG. 1 is oriented right-side up, FIG. 9 illustrates that in alternate configurations, the generator 100 is oriented upside down in a fluid flow such that the ribs 125 and sail 150 are positioned in the water and the base 105 is positioned above the water. The tidal, riparian, or other flow of the water causes the sail 150 to undulate and the ribs 125 to pivot on the support shaft 120.

ADDITIONAL CONSIDERATIONS

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a fluid-powered generator. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A fluid-powered generator comprising:
   a plurality of ribs disposed horizontally along a support shaft, each rib connected to a socket at a proximal end of the rib, each socket pivotably connected to the support shaft;
   an elongated flexible sail coupled to each rib of the plurality of ribs at a distal end of the rib;
   a crankshaft comprising a plurality of shafts, the plurality of shafts disposed horizontally along the crankshaft and parallel to the support shaft;
   a plurality of crank arms disposed horizontally along the crankshaft, each crank arm of the plurality of crank arms pivotably coupled to the crankshaft at a first end of the crank arm and to a medial point of a rib of the plurality of ribs at a second end of the crank arm, wherein the medial point of the rib is located between the proximal end of the rib and the distal end of the rib; and
   one or more interior supports, each interior support coupled to the support shaft at a bottom portion of the interior support and coupled to the crankshaft at a top portion of the interior support.

2. The fluid-powered generator of claim 1, wherein the plurality of ribs are disposed perpendicularly to the support shaft and are coupled to the support shaft by a connection mechanism.

3. The fluid-powered generator of claim 1, wherein the plurality of ribs are equidistantly spaced along the support shaft.

4. The fluid-powered generator of claim 1, wherein the plurality of ribs are comprised of a rigid material.

5. The fluid-powered generator of claim 1, further comprising an end support at each end of the fluid-powered generator, each end support coupled to the support shaft at a bottom portion of the end support and to the crankshaft at a top portion of the end support.

6. The fluid-powered generator of claim 1, wherein the crankshaft includes a plurality of throws coupled to the shafts, each throw comprising two vertical webs disposed perpendicularly to the shafts and a crank pin disposed parallel to the shaft between the vertical webs.

7. The fluid-powered generator of claim 6, wherein each crank arm is coupled to a crank pin of a corresponding throw.

8. The fluid-powered generator of claim 1, wherein the elongated flexible sail comprises a flexible fabric having an elongated rectangular shape.

9. The fluid-powered generator of claim 1, further comprising an electric generation subsystem operatively connected to the fluid-powered generator, the electric generation subsystem including a direct drive motor driven by rotation of the crankshaft so as to generate electricity.

10. The fluid-powered generator of claim 1, further comprising a pump operatively connected to the fluid-powered generator, wherein the fluid-powered generator exerts force on water moving through the pump.

11. A method for providing a fluid-powered generator, comprising:
    pivotably coupling a plurality of sockets to an elongated support shaft, each socket of the plurality of sockets connected to a rib of a plurality of ribs at a proximal end of rib, the plurality of sockets disposed horizontally along the support shaft and protruding perpendicularly from the elongated support shaft;
    attaching an elongated flexible sail to each rib of the plurality of ribs at a distal end of the rib;
    generating a crankshaft by arranging a plurality of co-linear shafts horizontally and parallel to the elongated support shaft, each shaft connected to an adjacent shaft by means of a throw;
    pivotably coupling a crank arm to each throw at a first end of the crank arm and to a medial point of a rib of the plurality of ribs at a second end of the crank arm, wherein the medial point of the rib is located between the proximal end and the distal end of the rib; and
    one or more interior supports, each interior support coupled to the elongated support shaft at a bottom portion of the interior support and coupled to the crankshaft at a top portion of the interior support.

12. The method of claim 11, wherein the plurality of ribs are equidistantly spaced along the elongated support shaft.

13. The method of claim 11, wherein the plurality of ribs are comprised of a rigid material.

14. The method of claim 11, further comprising attaching an end support at each end of the fluid-powered generator, each end support coupled to the elongated support shaft at a bottom portion of the end support and to the crank shaft at a top portion of the end support.

15. The method of claim 11, wherein each throw comprises two vertical shafts disposed perpendicularly to the shafts and a crank pin disposed parallel to the shaft between vertical webs.

16. The method of claim 15, wherein each crank arm is coupled to a crank pin of a corresponding throw.

17. The method of claim 11, wherein the elongated flexible sail comprises a flexible fabric having an elongated rectangular shape.

18. The method of claim 11, further comprising positioning the fluid-powered generator to engage with the flow of fluid.

19. The method of claim 18, wherein the fluid-powered generator is mounted horizontally and right-side up along the roof of a building and captures the flow of wind.

20. The method of claim 18, wherein the fluid-powered generator is mounted in a flowing body of water.

* * * * *